US007017882B2

(12) United States Patent
Marsh et al.

(10) Patent No.: US 7,017,882 B2
(45) Date of Patent: Mar. 28, 2006

(54) VALVE ASSEMBLY

(75) Inventors: Jeremy L. Marsh, Rancho Cucamonga, CA (US); Steven T. Anderson, Long Beach, CA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/842,265

(22) Filed: May 10, 2004

(65) Prior Publication Data

US 2005/0247900 A1 Nov. 10, 2005

(51) Int. Cl.
*F16K 31/02* (2006.01)

(52) U.S. Cl. .................... 251/77; 251/129.11; 251/248

(58) Field of Classification Search ............ 251/68–71, 251/77, 129.11–129.13, 252–255, 248, 249, 251/249.5, 250, 250.5

See application file for complete search history.

(56) References Cited

U.S. PATENT DOCUMENTS 2,906,143 A 9/1959 Musser
3,604,287 A 9/1971 Humphreys
3,640,140 A 2/1972 Gulick et al.
3,808,895 A 5/1974 Fitzwater
3,889,924 A 6/1975 Karpenko
4,114,469 A 9/1978 Stratienko
4,619,156 A 10/1986 Kiryu
4,823,638 A 4/1989 Ishikawa
4,906,881 A 3/1990 Knight
5,195,721 A 3/1993 Akkerman
5,338,993 A 8/1994 Briggs et al.
6,488,260 B1 12/2002 Dietz
6,769,665 B1 * 8/2004 Silva et al. .................. 251/71

* cited by examiner

*Primary Examiner*—David J. Walczak
*Assistant Examiner*—Peter deVore
(74) *Attorney, Agent, or Firm*—Marvin L. Union

(57) ABSTRACT

A valve assembly includes a valve stem which is connected with a valve. A drive member is disposed in engagement with the valve stem. A gear assembly is operable to rotate the drive member to effect axial movement of the valve stem. The gear assembly is driven by an electrical motor. In the event of a power failure, the valve may be moved to a closed condition by either a return spring or an auxiliary source of electrical energy. To facilitate movement of the valve between the open and closed conditions, the valve is pressure balanced.

40 Claims, 3 Drawing Sheets

VALVE ASSEMBLY

BACKGROUND OF THE INVENTION.

The present invention relates to a new and improved assembly for use in controlling a flow of fluid through a conduit.

A known valve assembly includes a valve having a valve stem. A nut is rotatable by a gear train. A wrap spring clutch connects the gear train with an electric motor. In the event of a power outage, an actuator spring is effective to operate the valve to a desired condition. An assembly having this construction is disclosed in U.S. Pat. No. 6,488,260. This known assembly has a substantial number of components and is rather bulky.

SUMMARY OF THE INVENTION

The present invention provides a new and improved assembly for controlling a flow of fluid through a conduit. The assembly includes a valve stem which is connected with a valve. A drive member is disposed in engagement with the valve stem. A gear assembly is connected with the drive member. A clutch assembly may be connected with the drive member and gear assembly.

An electric motor is connected with the clutch assembly. The electric motor is operable to move the drive member under the influence of force transmitted through the gear assembly and through the clutch assembly. Upon movement of the drive member, a return spring may be stressed to store energy to move the valve from the open condition to the closed condition.

The valve may be pressure balanced to minimize force required to actuate the valve. To pressure balance the valve, a pressure chamber is connected in fluid communication with one side of the valve by a passage which extends through the valve stem. The opposite side of the valve is connected with a second pressure chamber.

Compact construction of the valve assembly may be promoted by having the valve stem at least partially disposed in passages in the motor, gear assembly and clutch assembly. In addition, the valve stem may be at least partially disposed in a passage in the return spring. The return spring may be at least partially disposed in a passage in the motor and/or the clutch assembly.

An assembly constructed in accordance with the present invention has a plurality of different features. These features may be utilized in combination with each other in the manner disclosed herein. Alternatively, these features may be used separately or in different combinations with each other and with features from the prior art.

BRIEF DESCRIPTION OF THE DRAWINGS

The foregoing and other features of the present invention will become more apparent in view of the following description taken in connection with the accompanying drawings wherein.

DESCRIPTION OF SPECIFIC PREFERRED EMBODIMENTS OF THE INVENTION

General Description

Figure 1:
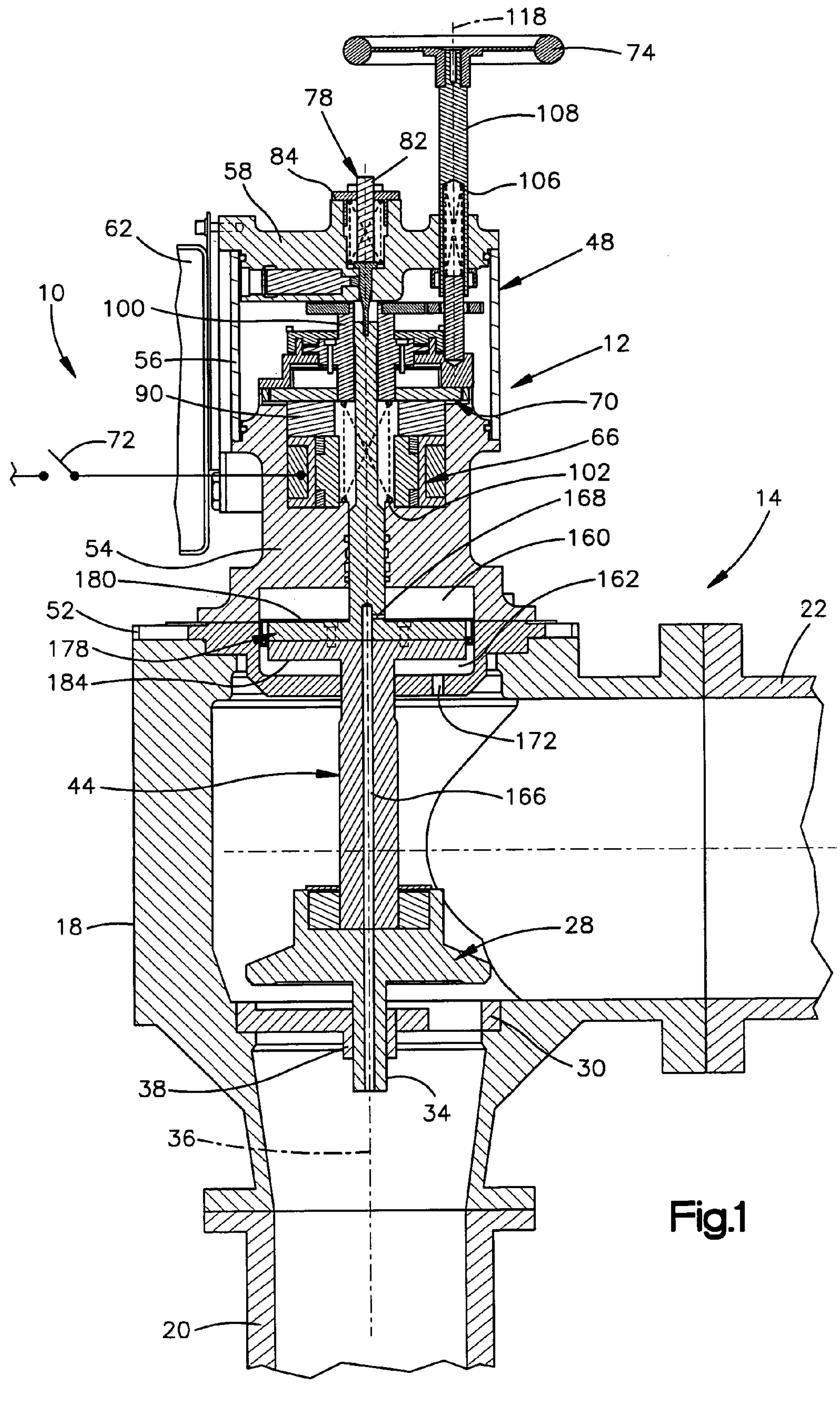
FIG. 1 is a schematic sectional view illustrating the relationship of a valve assembly constructed in accordance with the present invention to a conduit.

An assembly 10 constructed in accordance with the present-invention is illustrated in FIG. 1. The assembly 10 includes a valve assembly 12 which is connected with a conduit 14. The valve assembly 12 is operable to control fluid flow through the conduit 14.

The conduit 14 includes an elbow, 18 which is connected with a pair of pipes 20 and 22. Fluid may flow from the pipe 20 through the elbow 18 to the pipe 22. Alternatively, fluid may flow from the pipe 22 through the elbow 18 to the pipe 20. Although the conduit 14 has been illustrated in FIG. 1 as including an elbow 18 and a pair of pipes 20 and 22, the conduit 14 may have a different construction. For example, the elbow 18 may be eliminated and the valve assembly 12 connected with a linear conduit.

The valve assembly 12 may be utilized to control fluid flow in environments other than in association with a conduit. For example, the valve assembly 12 may be utilized in association with a boiler or any one of many different known types of machines or devices. The valve assembly 12 may be utilized to control the flow of fluid, such as a liquid, gas, or a mixture of liquid and gas. It is contemplated that the valve assembly 12 may be utilized to replace existing valves used in many different environments.

The valve assembly 12 includes a circular valve 28 which is movable between the open condition illustrated in FIG. 1 and a closed condition. When the valve 28 is in the open condition of FIG. 1, it is spaced from an annular valve seat 30 and is ineffective to block fluid flow through the conduit 14. When the valve 28 is in the closed condition, the valve engages the valve seat 30. When the valve 28 is in the closed condition, the valve is effective to block fluid flow through the conduit 14.

The valve 28 includes an axially extending projection 34 (FIG. 1). The projection 34 has a cylindrical configuration and has a central axis 36 which is coincident with a central axis of the valve 28. The projection 34 engages a guide 38 connected with the valve seat 30. The guide 38 cooperates with the projection 34 to guide movement of the valve 28 between the open and closed conditions. The guide 38 is coaxial with the valve seat 30 and valve 28.

A generally cylindrical valve stem 44 has a longitudinal central axis which is coincident with the axis 36. The valve stem 44 is disposed in a coaxial relationship with the circular valve 28. The valve stem 44 extends into a housing 48. The housing 48 of the valve assembly 12 is connected with the conduit 14. The housing 48 includes a circular base 52 which is fixedly secured to the conduit 14. It should be understood that the base 52 of the housing 48 may be adapted to be secured to many different types of apparatus other than the conduit 14.

A main section 54 (FIG. 1) of the housing 48 is fixedly secured to the base 52. The main section 54 of the housing 48 has a circular cross section and is coaxial with the valve stem 44 and valve 28. A cylindrical side wall 56 is connected with the main section 54 of the housing 48. An upper end wall 58 is connected to the side wall 56 of the housing.

Electrical controls 62 are connected with the housing 48. The electrical controls 62 are utilized in association with apparatus in the valve assembly 12 to control operation of the valve assembly. It is contemplated that many different known electrical controls 62 may be utilized in association with the valve assembly 12. The specific construction of the electrical controls 62 will depend upon the environment in which the valve assembly 12 is to be utilized.

Enclosed within the housing 48 (FIG. 1) is a cylindrical electrical motor 66 which is coaxial with the valve stem 44 and valve 28. The motor 66 is connected with the valve stem 44 by a drive train 70. When a switch 72 in the electrical controls 62 is closed, the motor 66 is energized. When the motor 66 is energized, the drive train 70 is operable to transmit force from the motor 66 to the valve stem 44 to effect axial movement of the valve 28 from the closed condition to the open condition.

Alternatively, the valve 28 may be operated between the open and closed conditions by manual rotation of a circular hand wheel 74. Manual rotation of the hand wheel 74 is effective to transmit force to the drive train 70 to move the valve 28 between the open and closed conditions in the unlikely event of a failure of the motor 66 to operate.

An indicator assembly 78 is mounted on the upper end wall 58 of the housing 48 and is connected with the valve stem 44. The indicator assembly 78 provides visual indication of the status of the valve 28 relative to the valve seat 30. When the valve 28 is in the closed condition engaging the valve seat 30 to block fluid flow through the conduit 14, an indicator member 82 extends for a relatively short distance outward from a housing 84. When the valve 28 is in the open condition, the indicator member 82 extends outward from the housing for a relatively large distance. The extent to Which the indicator member 82 extends outward from the housing 84 provides a clear visual indication to the operator of the assembly 10 of the position valve 28 relative to the valve seat 30.

Drive Train

The drive train 70 transmits force from the motor 66 to the valve stem 44 to move the valve 28 between its open and closed conditions. In addition, the drive train 66 transmits force from the hand wheel 74 to the valve stem 44 to effect movement of the valve 28 between its open and closed conditions.

When the motor 66 is energized by closing the switch 72 (FIG. 1), force is transmitted from the motor 66 to a clutch assembly 90 (FIG. 2) in the drive train 70. The cylindrical clutch assembly 90 is disposed in a coaxial relationship with the motor 66 and valve stem 44. The clutch assembly 90 is operable between engaged and disengaged conditions.

A solenoid (not shown) or other electrical actuator is operable by the closing of a switch in the electrical controls 62 to operate the clutch assembly 90 from the disengaged condition to the engaged condition. When the solenoid is deenergized by opening of the switch, a biasing spring operates the clutch assembly 90 from the engaged condition to the disengaged condition. When the clutch assembly 90 is in the engaged condition, it is operable to transmit force from and/or to the motor 66. When the clutch assembly 90 is in the disengaged condition, it is ineffective to transmit force from and/or to the motor 66.

The clutch assembly 90 is connected to a gear assembly 94 (FIG. 2) in the drive train 70. The gear assembly is cylindrical and is disposed in a coaxial relationship with the clutch assembly 90 and valve stem 44. The gear assembly 94 has a high reduction ratio and has an output member 96 (FIG. 2) which is rotated at a lower speed than an input member 98 connected with the output portion of the clutch assembly 90. This results in a corresponding increase in the force or torque which is available at the output member 96. If desired, the clutch assembly 90 may be omitted from the drive train 70.

Figure 2:
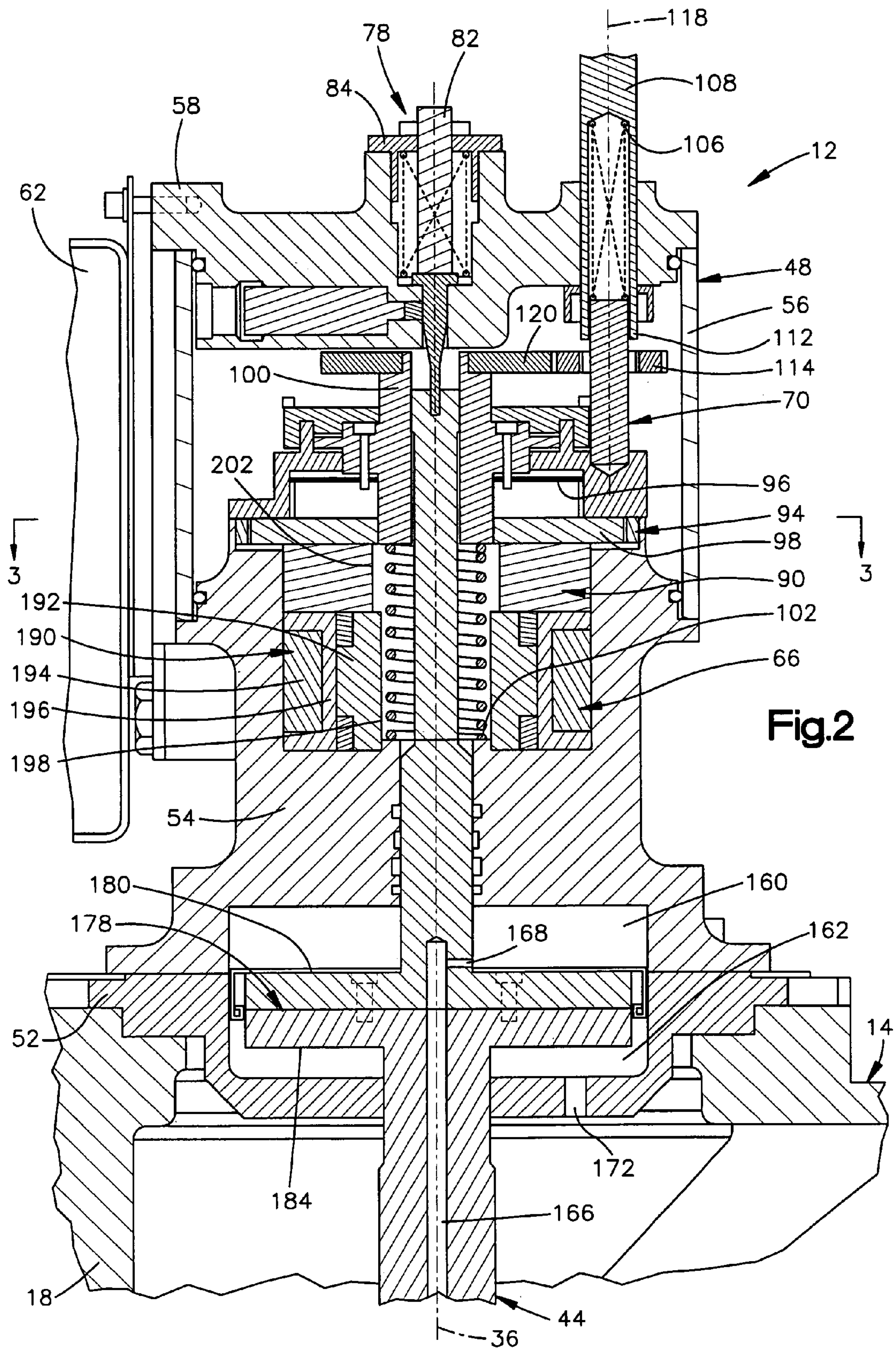
FIG. 2 is an enlarged fragmentary schematic sectional view of a portion of FIG. 1.

The output member 96 of the gear assembly 94 is connected to a circular flange on a drive member 100 (FIG. 2). The drive member 100 is formed as a nut and has an internal thread convolution which mates with an external thread convolution on the valve stem 44. Therefore, rotation of the drive member 100 by the output member 96 of the gear assembly 94 is effective to move the valve stem 44 along its longitudinal central axis 36.

The electric motor 66 is operable to drive the clutch assembly 90 and gear assembly 94 in a first direction to effect upward movement of the valve stem 44 to move the valve 28 (FIG. 1) from its closed condition engaging the valve seat 30 to its open condition illustrated in FIG. 1. When the electric motor 66 is deenergized by opening of the switch 72 (FIG. 1), the drive member 100 is driven in a second direction, which is opposite to the first direction, by a return spring 102. This results in the valve stem 44 being moved downward (as viewed in FIGS. 1 and 2) to move the valve 28 (FIG. 1) from its open condition spaced from the valve seat 30 to its closed condition in engagement with the valve seat.

The valve 28 is moved from its closed condition to its open condition by energy transmitted from the motor 66. The valve 28 is moved from its open condition to its closed condition by energy transmitted from the return spring 102. If desired, the return spring 102 may be omitted. If this is done, the motor 66 may be made reversible to move the valve 28 from its open condition to its closed condition.

In the unlikely event of a power failure or malfunction of the motor 66, the hand wheel 74 (FIG. 1) may be manually rotated to operate the drive train 70 to move the valve 28 between its open and closed conditions. When the hand wheel 74 is to be utilized to operate the valve 28 from its closed condition to its open condition, the hand wheel 74 is manually depressed against the influence of a biasing spring 106 (FIG. 2) disposed in a cavity in a hand wheel shaft 108. Manual depressing of the hand wheel 74 against the influence of the spring 106 moves a splined lower end portion 112 (FIG. 2) of the shaft 108 into engagement with internal spines on a spur gear 114.

Once the splined end portion of the shaft 108 has engaged the internal spines on the spur gear 114, rotation of the hand wheel 74 is effective to rotate the spur gear 114 about a longitudinal central axis 118 of the shaft 108 and hand wheel 74. Rotation of the spur gear 114 rotates a drive gear 120 about the central axis 36 of the valve stem 44. The drive gear 120 is fixedly connected to and coaxial with the drive member 100. Therefore, rotation of the drive gear 120 is effective to rotate the drive member 100 and to move the valve stem 44 along its longitudinal central axis 36.

When the hand wheel 74 is released with the valve 28 in the open condition of FIG. 1 and the motor 66 deenergized, the return spring 102 supplies energy to move the valve 28 back to its closed condition. Thus, the valve 28 is operated to its open condition either by electrical energy supplied to the motor 66 or by manual energy applied to the hand wheel 74. The valve 28 is operated to its closed condition by energy stored in the return spring 102 during movement of the valve to its open condition.

The indicator member 82 is connected with the valve stem 44. Therefore, when the valve stem 44 moved along its central axis 36 by the drive member 100, the indicator member 82 is moved axially relative to its housing 84. When the valve 28 is in the open condition illustrated in FIG. 1, a relatively large amount of the indicator member 82 extends from the housing 84. When the valve 28 is in its closed condition engaging the valve seat 30, a relatively small amount of the indicator member 82 extends from the housing 84.

Gear Assembly

It is contemplated that the gear assembly 98 may have many different constructions. However, the illustrated gear assembly 94 is a harmonic drive unit. By providing a gear assembly 94 which is a harmonic drive unit, the gear assembly can be made compact and can obtain a large reduction in the output speed of the motor 66 with a corresponding increase in the torque which is available to rotate the drive member 100. However, it should be understood that other known types of gear assemblies may be substituted for the harmonic drive unit which forms the gear assembly 94. It is believed that other known gear assemblies will be substituted for the harmonic drive unit when compact construction of the assembly 10 is not required.

Figure 3:
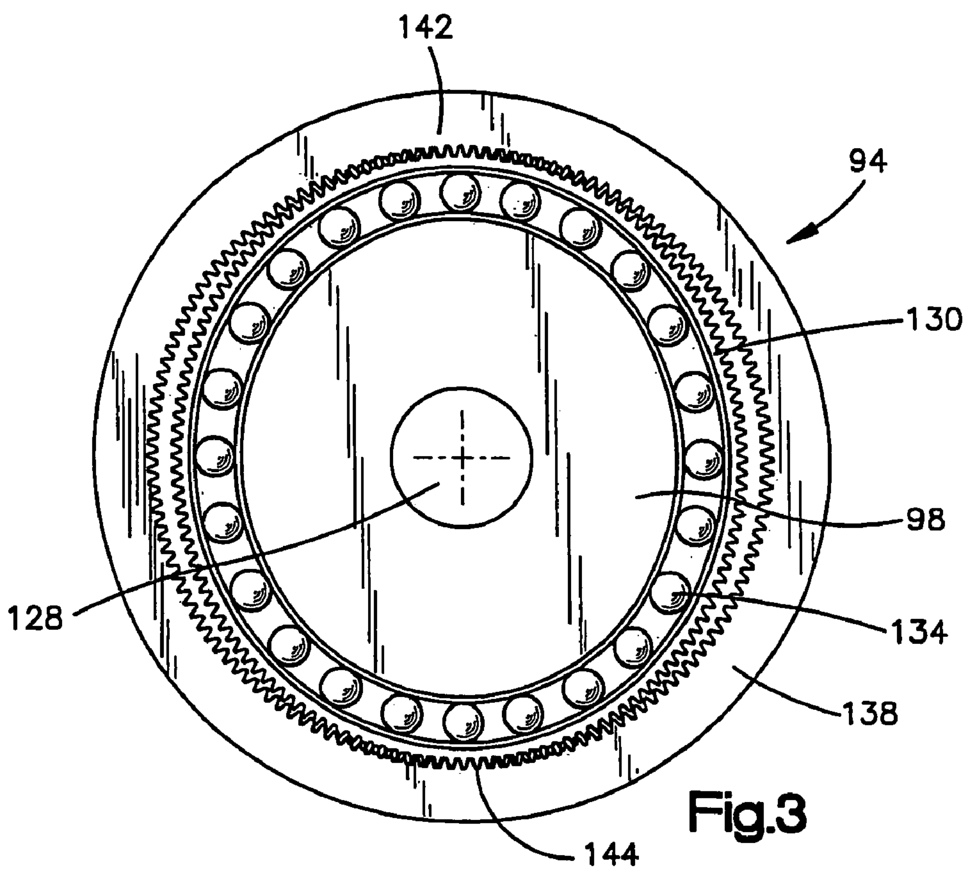
FIG. 3 is a schematic sectional view, taken generally along the line 3—3 of FIG. 2, illustrating the construction of a gear assembly.

The construction of the gear assembly 94 is illustrated schematically in FIG. 3. The gear assembly 94 includes an oval input member 98. The input member 98 is a wave generator having a generally elliptical configuration. The wave generator or input member 98 is fixedly connected with and rotated by an output member of the clutch assembly 90. The input member 98 has a central opening or passage 128 through which the drive member 100 (FIG. 2) extends. The input member 98 and drive member 100 are rotatable relative to each other about the axis 36.

An externally toothed flexspline 130 (FIG. 3) extends around the input member or wave generator 98. The flexspline 130 is connected to the drive member 100 (FIG. 2) by the output member 96. The output member 96 may be integrally formed as one piece with the flexspline 130. The flexspline 130 (FIG. 3) is flexible and is deformed to a configuration corresponding to the elliptical configuration of the wave generator or input member 98.

Ball bearings 134 (FIG. 3) are provided between the elliptical periphery of the input member 98 and the flexspline 130. The flexspline 130 has external teeth which mesh with a portion of a circular array of teeth on a rigid stationary outer spline 138. The ball bearings 134 enable the input member 98 to rotate relative to the flexspline 130.

The flexspline 130 is deformed into an elliptical shape by the input member or wave generator 98. Therefore, the external teeth on the flexspline 130 engage the internal teeth on the rigid circular outer spline 138 at two diametrically opposite locations. In FIG. 3, the diametrically opposite locations where the external teeth on the flexspline 130 engage the internal teeth on the rigid outer spline 138 are indicated by the numerals 142 and 144.

When the motor 66 (FIG. 2) is operated, the output from the clutch assembly 90 is effective to rotate the input member or wave generator 98 (FIG. 3) relative to the housing 48 (FIG. 2), drive member 100, and valve stem 44. Rotation of the input member or wave generator 98 through ninety degrees causes the locations 142 and 144 where the flexspline 130 engages the internal teeth on the stationary outer spline 138 to move by ninety degrees from the positions illustrated in FIG. 3. This results in engagement points of the teeth on the flexspline shifting along the elliptical periphery of the flexspline 130. As this occurs, the flexspline is moved through a relatively small portion of an arc. The manner in which the input member or wave generator 98, flexspline 130, and outer spline 138 cooperate is the same as disclosed in U.S. Pat. Nos. 2,906,143; 3,604,287; 4,619,156; and 4,823,638.

In the illustrated embodiment of the invention, the flexspline 130 is connected with the output member 96 (FIG. 2). The output member 96 is fixedly connected with the drive member 100. Therefore, when the flexspline 130 (FIG. 3) is rotated relative to the outer spline 138 and housing 48 by rotation of the input member or wave generator 98, the drive member 100 (FIG. 2) is rotated relative to the housing 48 and valve stem 44.

The outer spline 138 is fixedly connected to the housing 48. However, if desired, the gear assembly 94 may be constructed so that the flexspline 130 is fixedly connected with the housing 48 and the drive member 100 is connected with a rotatable outer spline 138. The compact construction of the gear assembly 94 contributes to the compact construction of the drive train 70 and the valve assembly 12.

Return Spring

The helical coil return spring 102 is effective to move the valve 28 (FIG. 1) from its open condition to, its closed condition. When the motor 66 is deenergized by either a power failure or an opening of the switch 72 (FIG. 1), the energy stored in the return spring 102 is effective to rotate the drive member 100 (FIG. 2). This rotation of the drive member 100 is effective to move the valve stem 44 downward (as viewed in FIGS. 1 and 2) to move the valve 28 into engagement with the valve seat 30 (FIG. 1).

In the event of a power failure, the clutch assembly 90 is automatically operated to its disengaged condition. To effect automatic operation of the clutch assembly to its engaged condition, an electrically operated actuator is energized to operate the clutch assembly to its engaged condition against the influence of a biasing spring (not shown). In the event of a power failure, the biasing spring causes the electrical actuator to operate the clutch assembly 90 to its disengaged condition. The general relationship between the electrical actuator, biasing spring and clutch assembly may be similar to that disclosed in U.S. Pat. No. 3,889,924. Alternatively, a wrap spring clutch of the type disclosed in U.S. Pat. No. 6,488,260 may be utilized.

When there is a power failure and the clutch assembly 90 is operated to the disengaged condition, the input member or wave generator 98 in the gear assembly 94 is disconnected from the motor 66. The drive member 100 rotates under the influence of force transmitted from the return spring 102. The upper (as viewed in FIG. 2) end of the cylindrical return spring 102 is fixedly connected to the drive member 100 and the lower end of the return spring is fixedly connected to the main section 54 of the housing 48.

As the drive member 100 is rotated by the return spring 102, the threaded engagement between the drive member and the valve stem 44 is effective to move the valve stem and valve 28 downward (as viewed in FIG. 1) to move the valve to its closed condition. Therefore, in the event of a power failure, the return spring 102 is effective to automatically close the valve 28. This results in blockage of fluid flow through the conduit 14 if there is a power failure.

Pressure Balancing

In order to minimize the power required by the motor 66 and return spring 102 to move the valve 28 (FIG. 1) between its open and closed conditions, the valve is pressure balanced. In the absence of pressure balancing, a relatively large torque is required to rotate the drive member 100 (FIG. 2) to move the valve stem against the influence of pressure differentials across the valve. By pressure balancing the valve, the forces applied to the valve stem 44 as a result of the pressure differential across the valve 28, are offset so that the valve can be moved with relatively little force.

To provide for pressure balancing, coaxial annular upper and lower pressure chambers 160 and 162 (FIG. 2) are provided in the housing 48. The upper pressure chamber 160 is connected in fluid communication with the pipe 20 (FIG. 1) by a main passage 166 which extends axially along the valve stem 44. A transverse passage 168 (FIG. 2) extends between the main passage 166 and the upper pressure chamber 160. The main passage 166 extends through and is coaxial with cylindrical the projection 34 (FIG. 1) on the valve 28. Therefore, the main passage 166 has an entrance which is exposed to fluid pressure on the side of the valve seat 30 opposite from the valve 28. This fluid pressure is conducted through the main passage 166 and transverse passage 168 to the upper pressure chamber 160.

The lower pressure chamber 162 (FIG. 2) is connected with an interior of the elbow 18 by a passage 172. Therefore, fluid pressure on the same side of the valve seat 30 (FIG. 1) as the valve 28 is conducted through the passage 172 to the lower pressure chamber 162.

The upper pressure chamber 160 is separated from the lower pressure chamber 162 by a circular piston 178 (FIG. 2). The piston 178 is coaxial with and is fixedly connected to the valve stem 44. An upper side 180 of the piston 178 is exposed to the fluid pressure in the upper pressure chamber 160.

The upper side 180 of the piston 178 has the same area as an opening in the valve seat 30. Therefore, when the valve 28 is in its closed position engaging the valve seat 30, the area on the valve against which the fluid pressure in the pipe 20 is applied is the same as the area of the upper side 180 of the piston 178. The upper and lower pressure chambers 160 and 162 are disposed in a coaxial relationship with the valve stem 44.

The fluid pressure from the pipe 20 is conducted to the upper pressure chamber 160 through the valve stem passages 166 and 168. Therefore, when the valve 28 is in the closed condition, the upward fluid pressure force applied by the fluid in the pipe 20 against the lower (as viewed in FIG. 1) side of the valve 28 is equal to the downward fluid pressure force applied against the upper side 180 of the piston 178 by the fluid pressure in the upper pressure chamber 160. Therefore, the upward force applied against the closed valve 28 is cancelled or offset by the downward force applied against the upper side 180 of the piston 178.

The piston 178 has a lower side 184 with a cross sectional area which is equal to the cross sectional area of the, opening in the valve seat 30 (FIG. 1) minus the cross sectional area of the portion of the valve stem 44 which is connected to the valve 28. When the valve 28 is in its closed condition and in engagement with the valve seat 30, the upper side of the valve is exposed to the fluid pressure in the pipe 22. A fluid tight connection is provided between the valve 28 and the portion of the valve stem 44 which is connected with the valve 28. Therefore, the effective area on the valve 28 which is exposed to the fluid pressure, in the pipe 22 is equal to the cross sectional size of the opening in the valve seat 30 minus the cross sectional size of the valve stem 44.

The lower side 184 of the piston 178 has an area which is equal to the effective cross sectional area of the upper side of the valve 28. The fluid pressure in the pipe 22 is conducted through the passage 172 into the lower pressure chamber 162. Therefore, the downward force applied by the fluid pressure in the pipe 22 against the closed valve 28 is equal to the upward force applied against the lower side 184 of the piston 178 by the fluid pressure in the lower pressure chamber 162.

By pressure balancing the valve 28 with the fluid pressure in the chambers 160 and 162, the force required to move the valve 28 from its closed condition to its open condition and to move the valve from its open condition to its closed condition is minimized. By minimizing the force required to move the valve 28 from its closed condition to its open condition, the current required to operate the motor 66 tends to be minimized. This enables the motor 66 to have a relatively compact construction. By minimizing the force required to move the valve 28 from its open condition to its closed condition, the energy which must be stored in the return spring 102 is minimized. This enables the return spring 102 to have a relatively compact construction.

Although it is preferred to pressure balance the valve 28, it is contemplated that the pressure balancing feature may be omitted. For example, if the valve 28 is exposed to relatively low fluid pressures, the motor 66 and return spring 102 may be powerful enough to move the valve in the absence of pressure balancing. Alternatively, the pressure chambers 160 and 162 and piston 178 may be constructed with relatively small upper and lower sides 180 and 182 so that only a portion of the fluid pressure applied to the valve 28 is offset by pressure balancing.

Motor-Drive Train Relationship

The compact construction of the valve assembly 12 is promoted by having the motor 66 and components of the drive train 70 in a coaxial relationship with the valve stem 44. In addition, compact construction of the valve assembly 12 is promoted by having components of the drive train 70 disposed in a telescopic relationship with each other, with the return spring 102, and with the motor 66. If desired, components of the drive train 70, return spring 102, and motor 66 may be coaxial without being in a telescopic relationship.

The motor 66 includes an annular a stator 190 (FIG. 2) which is connected to the main section 54 of the housing 48. In addition, the motor 66 includes an annular rotor 192 which is connected to an input member in the clutch assembly 90. The stator 190 includes an annular coil 194 and a stationary frame 196. When the coil 194 is energized, the rotor 192 rotates relative to the stator 190 and valve stem 44. The stator coil 194 is energized by closing the switch 72 (FIG. 1).

The stator 190 and rotor 192 (FIG. 2) are disposed in a coaxial relationship with the valve stem 44. The valve stem 44 extends through a cylindrical central passage 198 in the rotor 192. In addition, the return spring 102 extends through the passage 198 in the rotor 192. However, the rotor 192 is spaced from and is coaxial with the return spring 102 so that the rotor is freely rotatable relative to the return spring. The valve stem 44 is spaced from and is coaxial with the return spring 102 so that the valve stem is freely movable relative to the return spring.

The compact construction of the drive train 70 is promoted by providing the clutch assembly 90 with a cylindrical central passage 202 (FIG. 2) through which both the valve stem 44 and return spring 102 extend. The return spring 102 is spaced from and is coaxial with a cylindrical inner side surface of the passage 202. Therefore, the input member to the clutch assembly 90 can be freely rotated relative to the return spring 102 by the rotor 192 of the motor 66. The passage 202 also extends through the output member in the clutch assembly 90 so that the output member can rotate without interference with the return spring 102.

The drive member 100 (FIG. 2) is disposed in a coaxial relationship with the return spring 102 and the valve stem 44. The internal thread convolution on the drive member 100 meshes with the external thread convolution on the upper end portion of the valve stem 44 to connect the drive member with the valve stem. The upper end of the return spring 102 is fixedly connected to the drive member 100. Therefore, rotation of the drive member 100 about its longitudinal central axis as the valve 28 moves to the open condition, is effective to twist the return spring 102 with a torsional action to store energy in the return spring.

In the event of deenergization of the motor 66 by either opening the switch 72 (FIG. 1) or a power failure, the clutch assembly 90 is operated to its disengaged condition. The deenergization of the motor 66 by either opening the switch 72 (FIG. 1) or a power failure releases torsional force stored in the return spring 102. The torsional force stored in the return spring 102 is effective to rotate the drive member 100 to move the valve 28 from its open condition to its closed condition.

The compact construction of the valve assembly 12 is promoted by having a telescopic relationship between the valve stem 44, return spring 150, drive member 100, motor 66, and components of the drive train 70. This telescopic relationship enables the motor 66 to be disposed at a location which is between the upper pressure chamber 160 and the clutch assembly 90. The gear assembly 94 and the drive member 100 are disposed in a coaxial relationship with the motor 66 and are disposed upwardly (as viewed in FIG. 2) or outwardly of the motor.

If desired, the clutch assembly 90 may be omitted and the motor 66 connected directly to the gear assembly 94. If this is done, the force to move the valve 28 from its closed condition to its open condition would be transmitted from the rotor 192 of the motor 66 to the input member 98 in the gear assembly 94. When the motor 66 is deenergized by opening the switch 72 and/or a power failure, the force to move the valve 28 from its open condition to its closed condition would be transmitted from the return spring 102 to the drive member 100. Rotation of the drive member 100 by the return spring would also rotate the output member 96 of the gear assembly 94 and rotor 192 of the deenergized motor 66.

Operation

When the valve 28 is to be moved from its closed condition engaging the valve seat 30 to its open condition spaced from the valve seat, the electrical actuator for the clutch assembly 90 is operated to actuate the clutch assembly from its disengaged condition to its engaged condition. Operation of the clutch assembly 90 from its disengaged condition to its engaged condition connects the input member or wave generator 98 (FIG. 3) of the gear assembly 94 with the rotor 192 (FIG. 2) of the motor 66.

Energization of the stator coil 194 of the motor 66 is effective to cause the rotor 192 of the motor to rotate about the coincident central axes of the valve stem 44 and return spring 102. Rotation of the rotor 192 results in the transmission of force through the engaged clutch assembly 90 to the input member or wave generator 98 (FIG. 3) in the gear assembly 94. Rotation of the wave generator or input member 98 in the gear assembly 94 is effective to rotate the flexspline 130 and output member 96 (FIG. 2) of the gear assembly 94 relative to the housing 48. The output member 96 of the gear assembly 94 rotates the drive member 100 relative to the valve stem 44.

Due to the speed reduction obtained with the gear assembly 94, the output member 96 is rotated at a slower speed than the rotor 192 of the motor 66. While the output member 96 and drive member 100 rotate slower than the rotor 192 of the motor 66, the gear reduction achieved with the gear assembly 94 increases the torque which is applied to the drive member 100 by the gear assembly 94. The internal thread convolution on the drive member 100 cooperates with the external thread convolution on the upper end portion of the valve stem 44 to move the valve stem upward (as viewed in FIG. 2). This results in the valve 28 being moved from a closed position engaging the valve seat 30 to the open position illustrated in FIG. 1.

By balancing fluid pressure forces applied to the valve 28, the electrical energy required to operate the motor 66 to move the valve between its open and closed conditions tends to be minimized. Thus, the upward fluid pressure transmitted from the pipe 20 to the lower side of the valve 28 is offset by the downward pressure applied, against the upper side 180 of the piston 178. Similarly, the downward pressure applied against the upper side of the valve 28 by the fluid pressure in the pipe 22 is offset by the upward pressure applied against the lower side 184 of the piston 178.

Rotation of the drive member 100 is effective to torsionally stress the return spring 102 to store energy in the return spring. The upper end portion of the return spring 102 is fixedly connected to the drive member 100. The lower end of the return spring is fixedly connected to the main section 154 of the housing 48. When the drive member 100 is rotated relative to the main section 54 of the housing 48, the helical coil return spring 102 is twisted about the central axis 36 of the return spring. As the upper end portion of the return spring 102 is rotated about the axis 36 relative to the lower end portion of the return spring, the return spring is resiliently deflected in torsion.

Although a helical coil torsion spring is utilized as the return spring 102, it is contemplated that the return spring may have a different construction if desired. For example, a compression or a tension spring may be utilized. Alternatively, a band or bar type torsion spring may be utilized. Rather than extending around the valve stem 44, the return spring 102 may be at least partially disposed in the valve stem.

When the valve 28 has moved to the open position, the motor 66 is maintained in an energized condition and the clutch assembly 90 is maintained in an engaged condition. The components of the energized motor 66, engaged clutch assembly 90, and gear assembly 94 are effective to hold the drive member 100 against reverse rotation under the influence of force applied against the drive member by the return spring 102.

When the valve 28 is to be returned to its closed condition, the switch 72 is opened. The motor 60 is deenergized and the clutch assembly 90 is disengaged. The return spring 102 reverses the direction in which the drive member 100 was previously rotated. Reverse rotation of the drive member 100 results in the valve 28 and valve stem 44 being moved downward (as viewed in FIG. 1). This downward movement of the valve 28 moves the valve back to its closed position.

As the valve 28 is moved to its closed position, the return spring 102 is unwound and energy is transmitted from the return spring to the drive member 100 to rotate the drive member and move the valve 28. This enables the valve 28 to be quickly moved from its open condition to its closed condition by the return spring 102.

If there is a power failure with the valve 28 in its open condition, the energy stored in the return spring 102 is utilized to move the valve 28 back to its closed position. Thus, when there is a power failure, the motor 66 is deenergized and the clutch assembly 90 is disengaged. This releases the drive member 100 for reverse rotation. The energy stored in the torsionally deflected return spring 102 is effective to rotate the drive member about its central axis in a reverse direction to move the valve stem 44 downward (as viewed in FIG. 2). This moves the valve 28 to its closed position.

Alternative Embodiment

In the embodiment of the invention illustrated in FIGS. 1–3, the return spring 102 is utilized to store energy to move the valve 28 from the open position to the closed position. In the embodiment of the invention illustrated in FIG. 4, the electric motor is reversible and an auxiliary source of power is provided to return the valve 28 to its closed condition. Since the embodiment of the invention illustrated in FIG. 4 is generally similar to the embodiment of the invention in FIGS. 1–3, similar numerals will be utilized to designate similar components, the suffix letter "a" being added to the numerals of FIG. 4 to avoid confusion.

Figure 4:
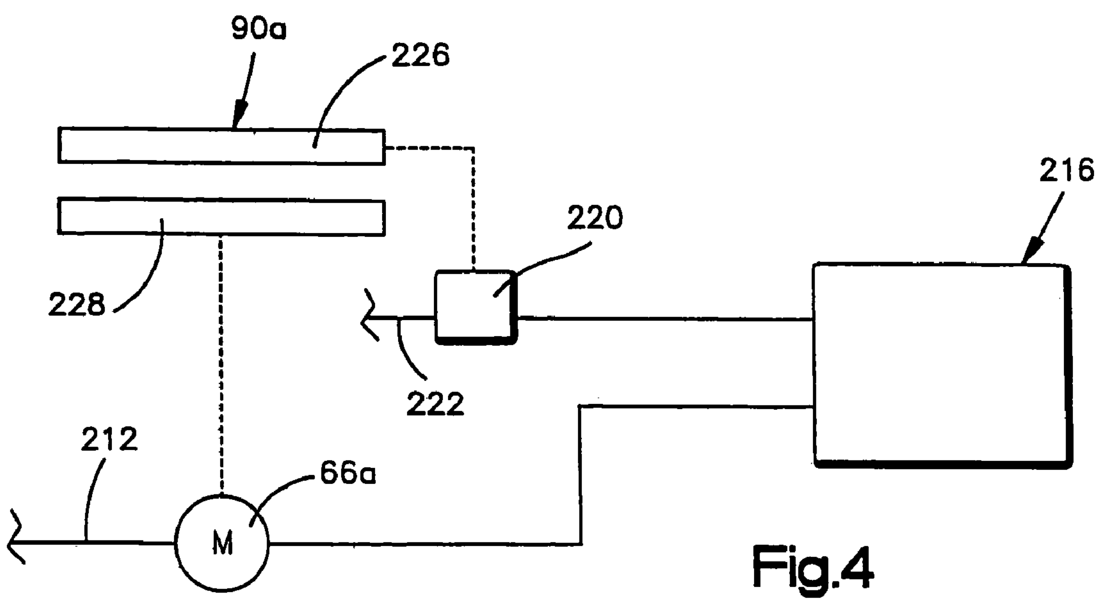
FIG. 4 is a schematized illustration depicting the relationship of a clutch assembly and a motor which form part of a valve assembly of FIGS. 1 and 2 to a clutch actuator and auxiliary source of power.

The apparatus of FIG. 4 is associated with a valve assembly having the same general construction as the valve assembly 12 of FIGS. 1–3. However, the apparatus of FIG. 4 is associated with a valve assembly which does not have a return spring 102 and in which the motor 66 is reversible. In other respects, the valve assembly with which the apparatus of FIG. 4 is associated has the same construction as the valve assembly 12.

The apparatus of FIG. 4 includes a clutch assembly **90*a* which is connected with a reversible electric motor 66*a*. The motor 66*a* is connected with a main source of power by conductor 212. During normal operation of the valve assembly, the motor 66*a* is supplied with power which is transmitted over the conductor 212. However, in the event of a failure of the main power supply, an auxiliary power supply 216 is effective to supply power to operate the motor 66*a***.

The clutch assembly **90*a* is operated from the disengaged condition illustrated in FIG. 4 to the engaged position by a solenoid 220. The solenoid 220 is connected with the main power supply by a conductor 222. When the clutch is to be operated from the disengaged condition illustrated schematically in FIG. 4 to the engaged condition, the solenoid 220 is operated to effect movement of an output member 226 of the clutch assembly 90*a* to engage an input member 228. The input member 228 is connected with the output from the motor 66*a***.

In the event of a failure of the main power supply, the electrical actuator 220 is energized by power from the auxiliary power supply 216. The auxiliary power supply 216 may be battery or capacitor. Of course, other known sources of electrical energy may be utilized for the auxiliary power supply 216.

If desired, a return spring, corresponding to the return spring 102 of FIG. 2 may be used in association with the apparatus of FIG. 4. If this is done, the valve assembly utilized with the apparatus of FIG. 4 would have the same construction as the valve assembly illustrated in FIGS. 1–3. The auxiliary power supply 216 would supply power to operate the motor 66 to move the valve 28 to its open position in the event of a failure of the main power supply. The solenoid 220 would be utilized to effect operation of the clutch assembly 90 to its engaged condition. The solenoid 220 may be used with or without the auxiliary power supply 216.

Conclusion

In view of the foregoing description, it is apparent that the present invention provides a new and improved assembly 10 for controlling a flow of fluid through a conduit 14. The assembly 10 includes a valve stem 44 which is connected with a valve 28. A drive member 100 is disposed in engagement with the valve stem 44. A gear assembly 94 is connected with the drive member 100. A clutch assembly 90 may be connected with the drive member 100 and gear assembly 94.

An electric motor 66 is connected with the clutch assembly 90. The electric motor 66 is operable to move the drive member 100 under the influence of force transmitted through the gear assembly 94 and through the clutch assembly 90. Upon movement of the drive member 100, a return spring 102 may be stressed to store energy to move the valve 28 from the open condition to the closed condition.

The valve 28 may be pressure balanced to minimize force required to actuate the valve. To pressure balance the valve, a pressure chamber 160 is connected in fluid communication with one side of the valve by a passage 166 which extends through the valve stem. The opposite side of the valve is connected with a second pressure chamber 162.

Compact construction of the assembly 10 may be promoted by having the valve stem 44 at least partially disposed in passages in the motor 66, gear assembly 94 and clutch assembly 90. In addition, the valve stem 44 may be at least partially disposed in a passage in the return spring 102. The return spring 102 may be at least partially disposed in the passage 198 in the motor 66 and/or the clutch assembly 90.

An assembly constructed in accordance with the present invention is a plurality of different features. These features may be utilized in combination with each other in the manner disclosed herein. Alternatively, these features may be used separately or in different combinations with each other and with features from the prior art.

Having described the invention, the following is claimed:

1. An assembly for use in controlling a flow of fluid through a conduit, said assembly comprising a valve movable between a closed condition at least partially blocking fluid flow through the conduit and an open condition in which said valve is ineffective to block fluid flow through the conduit, a housing, a valve stem connected with said valve and at least partially enclosed by said housing, a drive member disposed in engagement with said valve stem, a gear assembly at least partially disposed in said housing and connected with said drive member, a clutch assembly at least partially disposed in said housing and operable between an engaged condition and a disengaged condition, an electric motor at least partially disposed in said housing and operable to move said drive member relative to said valve stem under the influence force transmitted from said electric motor through said gear assembly and through said clutch assembly to said drive member when said clutch assembly is in the engaged condition, a spring connected with said housing and said drive member, said spring being stressed to store energy upon movement of said drive member relative to said valve stem, said spring being effective to move said drive member relative to said valve stem to move said valve from the open condition to the closed condition, first and second pressure chambers disposed in said housing, said first pressure chamber having a side surface connected with said valve stem, said second pressure chamber having a side surface connected with said valve stem, a first conduit extending through said valve and through a portion of said valve stem to conduct fluid pressure from a first side of said valve to said first pressure chamber, and a second conduit to conduct fluid pressure from a second side of said valve to said second pressure chamber.

2. An assembly as set forth in claim 1 wherein said valve includes a main section which is engagable with a valve seat upon movement of said valve to the closed condition and a projection which extends outward from said main section of said valve in a direction away from said first and second pressure chambers, said first conduit extends through and has an open end portion on said projection.

3. An assembly as set forth in claim 2 further including a guide having an opening into which said projection extends, said guide and projection cooperating to guide movement of said valve between the open and closed conditions.

4. An assembly as set forth in claim 1 wherein said gear assembly includes a harmonic drive unit which is disposed in a coaxial relationship with said valve stem.

5. An assembly as set forth in claim 4 wherein said harmonic drive unit includes a flexspline which extends around a portion of said valve stem, a rigid circular spline which extends around a portion of said valve stem; and a wave generator which effects deflection of at least a portion of said flex spline.

6. An assembly as set forth in claim 1 wherein said valve stem includes an external thread convolution, said drive member includes an internal thread convolution which is disposed in engagement with said external thread convolution, said electric motor being operable to rotate said drive member about a central axis of said valve stem.

7. An assembly as set forth in claim 1 wherein said electric motor includes a stator which is disposed in said housing and extends around said valve stem and a rotor which is disposed in said housing and extends around said valve stem.

8. An assembly as set forth in claim 1 wherein said drive member is rotatable under the influence of force transmitted from said electric motor when said electric motor is energized to increase stress in said spring during movement of said valve member from the closed condition to the open condition, said drive member being rotatable under the influence of force transmitted from said spring to move said valve member from the open condition to the closed condition when said electric motor is in a deenergized condition.

9. An assembly as set forth in claim 8 wherein said spring is disposed in a coaxial relationship with said electric motor and extends at least part way through said electric motor.

10. An assembly as set forth in claim 1 wherein said spring has a central passage in which at least a portion of said valve stem is disposed, said electric motor has a central passage in which at least a portion of said spring and a portion of said valve stem are disposed.

11. An assembly as set forth in claim 10 wherein said clutch assembly has a central passage in which at least a portion of said spring and said valve stem are disposed.

12. An assembly as set forth in claim 11 wherein said drive member has a central passage in which at least a portion of said valve stem is disposed, said spring being disposed between said drive member and said valve.

13. An assembly as set forth in claim 10 wherein said gear assembly has a central passage in which at least a portion of said valve stem and drive member are disposed.

14. An assembly as set forth in claim 1 wherein said gear assembly is connected with a portion of said drive member, said clutch assembly is connected with a portion of said gear assembly, said electric motor is connected with a portion of said clutch assembly, said electric motor being disposed in said housing at a location which is closer to said valve than a location where said gear assembly is disposed in said housing, said clutch assembly being disposed in said housing between said gear assembly and said electric motor.

15. An assembly as set forth in claim 1 wherein said electric motor is normally maintained in an energized condition when said valve is in the open condition to enable said electric motor to oppose said spring, said spring being effective to move said valve from the open condition to the closed condition when said electric motor is in a deenergized condition.

16. An assembly as set forth in claim 1 wherein said electric motor includes a rotor and a stator, said stator being energizable to urge said rotor to rotate against the influence of said spring to move said valve to the open condition and to maintain said valve in the open condition against the influence of said spring, said spring being effective to move said valve from the open condition to the closed condition upon deenergization of said stator.

17. An assembly as set forth in claim 16 wherein said valve stem and said spring extend through said rotor and are coaxial with said rotor.

18. An assembly as set forth in claim 16 wherein said rotor is rotatable about a central axis of said valve stem.

19. An assembly as set forth in claim 16 wherein said stator is connected with a first source of electrical energy, said assembly further includes a second source of electrical energy which is connected with said stator and is effective to energize said stator in the event said first source of electrical energy fails.

20. An assembly for use in controlling a flow of fluid through a conduit, said assembly comprising a valve movable between a closed condition at least partially blocking fluid flow through the conduit and an open condition in which said valve is ineffective to block fluid flow through the conduit, a housing connectable with the conduit, a valve stem connected with said valve and at least partially enclosed by said housing, a drive member at least partially disposed in said housing and disposed in engagement with said valve stem, said drive member having a central passage in which at least a portion of said valve stem is disposed, a gear assembly at least partially disposed in said housing and connected with said drive member, said gear assembly having a central passage in which at least a portion of said valve stem is disposed, a clutch assembly at least partially disposed in said housing and operable between an engaged condition and a disengaged condition, said clutch assembly having a central passage in which at least a portion of said valve stem is disposed, and an electric motor connected with said clutch assembly and operable to move said drive member under the influence of force transmitted to said gear assembly through said clutch assembly when said clutch assembly is in the engaged condition, said electric motor having a central passage in which at least a portion of said valve stem is disposed.

21. An assembly as set forth in claim 20 further including first and second pressure chambers disposed in said housing, said first pressure chamber having a side surface connected with said valve stem, said second pressure chamber having a side surface connected with said valve stem, a first conduit extending through said valve and through a portion of said valve stem to conduct fluid pressure from a first side of said valve to said first pressure chamber, and a second conduit to conduct fluid pressure from a second side of said valve to said second pressure chamber.

22. An assembly as set forth in claim 20 further including a spring connected with said housing and drive member, said spring having a central passage in which at least a portion of said valve stem is disposed, said spring is effective to move said drive member relative to said valve stem upon operation of said clutch assembly to the disengaged condition to move said valve from the open condition to the closed condition.

23. An assembly as set forth in claim 20 wherein said motor is connected with a first source of electrical energy, said assembly further includes a second source of electrical energy which is connected with said motor and is operable to effect operation of said motor in the event said first source of electrical energy fails.

24. An assembly as set forth in claim 23 further including an electrical actuator which is connected with said clutch assembly and is operable to effect operation of said clutch assembly between the engaged and disengaged conditions, said electrical actuator being connected with said first source of electrical energy, said electrical actuator being connected with said second source of electrical energy which is operable to supply power to said electrical actuator in the event said first source of electrical energy fails.

25. An assembly for use in controlling a flow of fluid through a conduit, said assembly comprising a valve movable between a closed condition at least partially blocking fluid flow through the conduit and an open condition in which said valve is ineffective to block fluid flow through the conduit, a housing, a valve stem connected with said valve and at least partially enclosed by said housing, said valve stem having a central axis which extends through said valve, a drive member at least partially disposed in said housing, said drive member being disposed in a coaxial relationship with said valve stem, a gear assembly at least partially disposed in said housing and connected with said drive member, said gear assembly being disposed in a coaxial relationship with said valve stem, a clutch assembly at least partially disposed in said housing and operable between an engaged condition and a disengaged condition, said clutch assembly being disposed in a coaxial relationship with said valve stem, an electric motor connected with said clutch assembly and operable to move said drive member under the influence force transmitted through said gear assembly and through said clutch assembly when said clutch assembly is in the engaged condition, said electric motor being disposed in a coaxial relationship with said valve stem, and a spring connected with said housing and said drive member, said spring being stressed to store energy upon movement of said drive member, said spring being effective to move said drive member relative to said housing to move said valve from the open condition to the closed condition, said spring being disposed in a coaxial relationship with said valve stem.

26. An assembly as set forth in claim 25 further including first and second pressure chambers disposed in said housing in a coaxial relationship with said valve stem, said first pressure chamber having a side surface connected with said valve stem, said second pressure chamber having a side surface connected with said valve stem, a first conduit extending through said valve and through a portion of said valve stem to conduct fluid pressure from a first side of said valve to said first pressure chamber, and a second conduit to conduct fluid pressure from a second side of said valve to said second pressure chamber.

27. An assembly as set forth in claim 25 wherein said gear assembly includes a harmonic drive unit.

28. An assembly as set forth in claim 27 wherein said harmonic drive unit includes a flexspline which extends around a portion of said valve stem, a rigid spline which extends around a portion of said valve stem, and a wave generator which effects deflection of at least a portion of said flex spline.

29. An assembly as set forth in claim 25 wherein said valve stem includes an external thread convolution, said drive member includes an internal thread convolution which is disposed in engagement with said external thread convolution, said electric motor being operable to rotate said drive member about the central axis of said valve stem.

30. An assembly as set forth in claim 25 wherein said electric motor includes a stator which is disposed in said housing and extends around said valve stem and a rotor which is disposed in said housing and extends around said valve stem, said valve stem being rotatable relative to said rotor and stator of said electric motor during operation of said electric motor.

31. An assembly as set forth in claim 25 wherein said drive member is rotatable about a central axis of said valve stem under the influence of force transmitted from said motor to increase stress in said spring during movement of said valve member from the closed condition to the open condition, said drive member being rotatable about the central axis of said valve stem under the influence of force transmitted from said spring to move said valve member from the open condition to the dosed condition when said clutch assembly is in the disengaged condition.

32. An assembly as set forth in claim 25 wherein said electric motor is normally maintained in an energized condition when said valve is in the open condition to enable said electric motor to oppose said spring, said spring being effective to move said valve from the open condition to the closed condition when said electric motor is in a deenergized condition.

33. An assembly as set forth in claim 25 wherein said electric motor includes a rotor and a stator, said stator being energizable to urge said rotor to rotate against the influence of said spring to move said valve to the open condition and to maintain said valve in the open condition against the influence of said spring, said spring being effective to move said valve from the open condition to the dosed condition upon deenergization of said stator.

34. An assembly as set forth in claim 33 wherein said stator is connected with a first source of electrical energy, said assembly further includes a second source of electrical energy which is connected with said stator and is effective to energize said stator in the event said first source of electrical energy fails.

35. An assembly for use in controlling a flow of fluid through a conduit, said assembly comprising a valve movable between a dosed condition at least partially blocking fluid flow through the conduit and an open condition in which said valve is ineffective to block fluid flow through the conduit, a housing connectable with the conduit, a valve stem connected with said valve and at least partially enclosed by said housing, a drive member at least partially disposed in said housing and disposed in engagement with said valve stem, said drive member having a central passage in which at least a portion of said valve stem is disposed, a gear assembly at least partially disposed in said housing and connected with said drive member, said gear assembly having a central passage in which at least a portion of said valve stem is disposed, an electric motor connected with said gear assembly and operable to move said drive member under the influence of force transmitted through said gear assembly to move said valve from the closed condition to the open condition, and a spring connected with said housing and having a central passage in which at least a portion of said valve stem is disposed, said spring being at least partially disposed in a central passage in said motor and being effective to move said drive member relative to said valve stem to move said valve from the open condition to the closed condition.

36. An assembly as set forth in claim 35 further including first and second pressure chambers disposed in said housing, said first pressure chamber having a side surface connected with said valve stem, said second pressure chamber having a side surface connected with said valve stem, a first conduit extending through a portion of said valve stem to conduct fluid pressure from a first side of said valve to said first pressure chamber, and a second conduit to conduct fluid pressure from a second side of said valve to said second pressure chamber.

37. An assembly as set forth in claim 35 wherein said motor is connected with a first source of electrical energy, said assembly further includes a second source of electrical energy which is connected with said motor and is operable to effect operation of said motor in the event said first source of electrical energy fails.

38. An assembly as set forth in claim 37 further including a clutch assembly at least partially disposed in said housing and operable between an engaged condition and a disengaged condition, said clutch assembly being connected with said electric motor and having a central passage in which at least a portion of said valve stem and at least a portion of said spring are disposed.

39. An assembly for use in controlling a flow of fluid through a conduit, said assembly comprising a valve movable between a closed condition at least partially blocking fluid flow through the conduit and an open condition in which said valve is ineffective to block fluid flow through the conduit, a housing, a valve stem connected with said valve and at least partially enclosed by said housing, a drive member having an internal thread convolution which cooperates with an external thread convolution on said valve stem, a gear assembly at least partially disposed in said housing and connected with said drive member, a clutch assembly at least partially disposed in said housing and operable between an engaged condition and a disengaged condition, an electric motor at least partially disposed in said housing and operable to rotate said drive member relative to said valve stem under the influence force transmitted from said electric motor through said gear assembly and through said clutch assembly when said clutch assembly is in the engaged condition, a spring connected with said housing and said drive member and disposed in a coaxial relationship with and extending at least part way through said electric motor and said clutch assembly, said spring being stressed to store energy upon movement of said drive member relative to said valve stem, said spring being effective to move said drive member relative to said valve stem to move said valve from the open condition to the closed condition, first and second pressure chambers disposed in said housing, a first conduit to conduct fluid pressure from a first side of said valve to said first pressure chamber, and a second conduit to conduct fluid pressure from a second side of said valve to said second pressure chamber.

40. An assembly for use in controlling a flow of fluid through a conduit, said assembly comprising a valve movable between a closed condition at least partially blocking fluid flow through the conduit and an open condition in which said valve is ineffective to block fluid flow through the conduit, a housing, a valve stem connected with said valve and at least partially enclosed by said housing, a drive member disposed in engagement with said valve stem, a gear assembly at least partially disposed in said housing and connected with said drive member, a clutch assembly at least partially disposed in said housing and operable between an engaged condition and a disengaged condition, said clutch assembly being connected with said drive member and with said gear assembly, an electric motor at least partially disposed in said housing and operable to move said drive member relative to said valve stem under the influence force transmitted from said electric motor through said gear assembly and through said clutch assembly to said drive member when said clutch assembly is in the engaged condition, said electric motor being disposed in said housing at a location which is closer to said valve than a location where said gear assembly is disposed in said housing, said electric motor includes a rotor and a stator, said rotor being rotatable relative to said valve stem during operation of said electric motor with said clutch assembly in the engaged condition, and a spring connected with said housing and said drive member, said spring being stressed to store energy upon movement of said drive member relative to said valve stem, said spring being effective to move said drive member relative to said valve stem to move said valve from the open condition to the closed condition, first and second pressure chambers disposed in said housing, said first pressure chamber having a side surface connected with said valve stem, said second pressure chamber having a side surface connected with said valve stem, a first conduit to conduct fluid pressure from a first side of said valve to said first pressure chamber, and a second conduit to conduct fluid pressure from a second side of said valve to said second pressure chamber.

* * * * *